(12) United States Patent
Park et al.

(10) Patent No.: US 12,332,361 B2
(45) Date of Patent: Jun. 17, 2025

(54) APPARATUS FOR GENERATING VIRTUAL OBSERVATION OF USER CARRIER FOR PRECISE GLOBAL NAVIGATION SATELLITE SYSTEM USER POSITIONING BASED ON HOMOGENEOUS NETWORK REAL TIME KINEMATIC CORRECTIONS AND METHOD THEREOF

(71) Applicant: INDUSTRY ACADEMY COOPERATION FOUNDATION OF SEJONG UNIVERSITY, Seoul (KR)

(72) Inventors: Byung Woon Park, Seoul (KR); Cheol Soon Lim, Bucheon-si (KR); Sung Kyung Hong, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 434 days.

(21) Appl. No.: 17/975,936

(22) Filed: Oct. 28, 2022

(65) Prior Publication Data
US 2024/0094413 A1 Mar. 21, 2024

(30) Foreign Application Priority Data
Sep. 8, 2022 (KR) .......................... 10-2022-0114180

(51) Int. Cl.
*G01S 19/07* (2010.01)
*G01S 19/43* (2010.01)
*H04W 64/00* (2009.01)

(52) U.S. Cl.
CPC ........... *G01S 19/43* (2013.01); *H04W 64/003* (2013.01)

(58) Field of Classification Search
CPC ........ G01S 19/43; G01S 19/04; G01S 19/073; G01S 19/40; G01S 19/44; H04W 64/003
See application file for complete search history.

(56) References Cited

U.S. PATENT DOCUMENTS

| | | | |
|---|---|---|---|
| 11,506,796 B2* | 11/2022 | Chen | G01S 19/44 |
| 12,216,218 B2* | 2/2025 | Huang | G01S 19/44 |

(Continued)

FOREIGN PATENT DOCUMENTS

| | | |
|---|---|---|
| KR | 10-1699437 B1 | 1/2017 |
| KR | 10-2040190 B1 | 12/2019 |

(Continued)

OTHER PUBLICATIONS

Korean Notice of Allowance issued Apr. 19, 2024 in Application No. 10-2022-0114180.

*Primary Examiner* — Dhaval V Patel
(74) *Attorney, Agent, or Firm* — Sughrue Mion, PLLC (57) ABSTRACT

Disclosed are an apparatus for generating a user's virtual observation and a method thereof. More particularly, the apparatus for generating user's virtual observation according to an embodiment includes a master reference station carrier observation receiver configured to receive a carrier measurement of a master reference station of a first network from a preset area divided into a first network to an n-th network (where n is a positive integer) by multiple reference stations; a spatial separation compensation correction information receiver configured to set a path from the master reference station of the first network to a user's terminal and to receive spatial separation compensation correction information of at least one network corresponding to the set path among the first network to the n-th network; and using a user's virtual observation generator configured to generate a virtual observation, in which a spatial separation error of a user's positioning is compensated, using the carrier measurement of the master reference station of the first network and the spatial separation compensation correction information of each of the at least one network.

10 Claims, 8 Drawing Sheets

(56) References Cited

U.S. PATENT DOCUMENTS

2022/0018968 A1\* 1/2022 Tsumura ................. H04W 4/02
2023/0003908 A1\* 1/2023 Gunnarsson .......... G01S 5/0018

FOREIGN PATENT DOCUMENTS

KR 10-2020-0065589 A 6/2020
KR 10-2168361 B1 10/2020

\* cited by examiner

APPARATUS FOR GENERATING VIRTUAL OBSERVATION OF USER CARRIER FOR PRECISE GLOBAL NAVIGATION SATELLITE SYSTEM USER POSITIONING BASED ON HOMOGENEOUS NETWORK REAL TIME KINEMATIC CORRECTIONS AND METHOD THEREOF

CROSS-REFERENCE TO RELATED APPLICATION

This application claims priority to Korean Patent Application No. 10-2022-0114180, filed on Sep. 8, 2022 in the Korean Intellectual Property Office, the disclosure of which is incorporated herein by reference.

BACKGROUND OF THE DISCLOSURE

Field of the Disclosure

The present disclosure relates to a virtual observation generation apparatus and method for calculating user's precise positioning, and more particularly, to a technical idea of applying RTK correction information to a user measurement.

Description of the Related Art

Global Navigation Satellite System (GNSS) error correction information provided by a carrier-based augmentation system can be divided into the Observation Space Representation (OSR) method and the State Space Representation (SSR) method. Examples of a representative OSR augmentation system include Real Time Kinematic (RTK), Network RTK, and the like, and examples of an SSR augmentation system include Precise Point Positioning (PPP), PPP-RTK, and the like.

Since the OSR method is based on a high spatiotemporal correlation of a measurement error between a user and a reference station, the user's positioning accuracy decreases as the baseline distance between the user and the reference station increases. To implement a cm-level nationwide service based on the OSR augmentation system with the characteristic, one-way broadcasting of all reference station correction information within a service area such that a user can select and select correction information of a nearby reference station within about 10 to 20 km, or two-way communication between a user and an infrastructure to model and provide correction information suitable for user's positioning is essentially required. For this reason, the current OSR method is unsuitable for a satellite-based nationwide precise positioning service.

On the other hand, the SSR method provides users with correction information for each GNSS error component modeled by using multiple reference stations, unlike the OSR method, so that all users within a service area receive the same correction information. In addition, it is a method suitable for a satellite-based correction information broadcasting service because the transmission period of each correction information can be scheduled according to the GNSS error characteristics. However, in the case of the SSR method, it takes up to several minutes for positioning accuracy to converge to a certain level after receiving all correction information broadcasted at different intervals. That is, the SSR method has advantages in terms of bandwidth, but lower positioning accuracy and long initialization time compared to OSR are fatal disadvantages.

Here, RTK is a carrier-based differential positioning technique that provides cm-level positioning accuracy by removing a GNSS common error through a difference between a user and a reference station carrier measurement and determining a carrier's unspecified number, and utilizes the spatial correlation of a GNSS error included in a measurement between an adjacent user and a reference station. Basically, major errors are removed through a difference between a carrier measurement obtained from a user receiver and a carrier measurement obtained from a reference station receiver. If a baseline distance between the user and the reference station is within about 20 km, the size of a residual after a difference in the measurement is negligible, so it is possible to accurately determine an unspecified integer within a short time with high probability. However, as the baseline distance increases, the spatial decorrelation of the GNSS error increases, leaving a bias-type error in a carrier difference measurement. Accordingly, there are disadvantages in that it takes a lot of time to determine an unspecified number, and the performance of determining an unspecified number deteriorates. Here, since the property of a carrier measurement acquired from a reference station receiver is basically used in the same way as a carrier measurement acquired from a user receiver, and there is a form of modified measurement such as Carrier Phase Correction (CPC) of Compact RTK, it is collectively referred to as a master reference station carrier observation to prevent confusion when applied to a user measurement.

That is, to expand the RTK service area while maintaining the cm-level user positioning accuracy, an RTK reference station should be installed and operated every 10 to 20 km, which requires huge construction and maintenance costs.

To compensate for the shortcomings of RTK based on a single reference station, a network RTK system capable of connecting multiple reference stations through a network, modeling GNSS errors in real-time, and providing users with correction information for each error has been proposed.

Network RTK is a system capable of expanding a usable range from 10 to 20 km to a radius of 50 to 100 km while maintaining positioning accuracy at the same cm level as an existing single reference station RTK by connecting multiple reference stations through a network to form a reference station network and by modeling GNSS errors using measurements collected from each reference station. Network RTK is divided into Virtual Reference Station (VRS), Flachen Korrektur Parameter (FKP), and Master-Auxiliary Concept (MAC) according to a correction information generation method.

The VRS method compensates for a user measurement error in the same way as if there is a reference station near the user by utilizing GNSS observations collected from a reference station network to generate a carrier measurement in virtual reference station positioning and by providing the generated carrier measurement to the user.

FKP models the satellite orbit error, ionospheric and tropospheric errors within a reference station network assuming a two-dimensional plane, and provides a user with information on the latitude and longitude gradients of an error plane, thereby alleviating the spatial separation error between user-reference station measurements.

To compensate for the shortcomings of the VRS and FKP methods, the MAC method provides a user with a difference of correction values between a master-auxiliary reference station constituting a network to compensate for a spatial separation error between user-reference station measurement values in a user-directed manner.

Unlike VRS providing the same correction information as a single reference station RTK, the FKP and MAC methods provide additional spatial separation compensation correction information in addition to a master reference station carrier measurement. By the FKP and MAC method, there are advantages in that a user can combine the two pieces of information to create a virtual observation in which a spatial separation error, which increases in proportion to a baseline distance between a master reference station and the user, is compensated, and double-differentiate the created virtual observation from a user carrier measurement to obtain a precise positioning; but in the traditional network RTK method including FKP and MAC as well as VRS, the error planes of adjacent reference station networks are discontinuous from each other.

That is, in the existing Network RTK system, a reference station network operates independently of each other, so there is a problem that network RTK correction information (e.g., FKP Gradients, MAC Correction Differences) and master reference station observations generated from all reference station networks in the service area are required for nationwide service.

RELATED ART DOCUMENTS

Patent Documents

Korean Patent No. 10-2168361, "CLUSTER DESIGN METHOD AND DEVICE FOR PROVIDING PRECISE LOCATION INFORMATION"
Korean Patent No. 10-2040190, "System for Cluster Design Simulation, Method and Computer Readable Recording Medium"

SUMMARY OF THE DISCLOSURE

Therefore, the present disclosure has been made in view of the above problems, and it is an object of the present disclosure to provide a user's virtual observation generation apparatus and method capable of generating user's virtual observations in which a spatial separation error is compensated based on a hybrid-type HN-RTK (homogeneous network RTK) wherein the advantages of existing OSR and SSR methods are combined in consideration of a satellite-based nationwide precise positioning service.

It is another object of the present disclosure to provide a user's virtual observation generation apparatus and method capable of compensating for spatial separation errors of user measurements in the entire area only with a carrier measurement received from one master reference station based on HN-RTK.

It is yet another object of the present disclosure to provide a user's virtual observation generation apparatus and method capable of minimizing an initialization process according to the occurrence of a handover based on HN-RTK and a consequent delay time.

In accordance with an aspect of the present invention, the above and other objects can be accomplished by the provision of an apparatus for generating user's virtual observation, including: a master reference station carrier observation receiver configured to receive a carrier measurement of a master reference station of a first network from a preset area divided into a first network to an n-th network (where n is a positive integer) by multiple reference stations; a spatial separation compensation correction information receiver configured to set a path from the master reference station of the first network to a user's terminal and to receive spatial separation compensation correction information of at least one network corresponding to the set path among the first network to the n-th network; and using a user's virtual observation generator configured to generate a user's virtual observation of the user's terminal, in which a spatial separation error is compensated, using the carrier measurement of the master reference station of the first network and the spatial separation compensation correction information of each of the at least one network.

In accordance with an aspect, when the user's terminal is positioned on a k-th network (where k is a positive integer satisfying 1<k≤n) among the first network to the n-th network, the master reference station carrier observation receiver may receive a master reference station carrier observation of each of the first network to the k-th network.

In accordance with an aspect, the spatial separation compensation correction information receiver may accumulate spatial separation compensation correction information calculated based on positioning information of a master reference station of each network to compensate a spatial separation error from the first network to the k−1-th network, may add spatial separation compensation correction information combined based on positioning information of the user's terminal in the k-th network to a carrier measurement of the first network to generate a carrier's virtual observation corresponding to the user's position in the k-th network, and finally double-differentiating the generated carrier's virtual observation from the user measurement to calculate precise positioning.

In accordance with an aspect, the spatial separation compensation correction information of the k−1-th network may be carrier correction information combined based on inclination information and distance information between multiple auxiliary reference stations provided in the master reference station of the k−1-th network and the k−1-th network.

In accordance with an aspect, the spatial separation compensation correction information of the k-th network may be inclination information between the master reference station of the k-th network and multiple auxiliary reference stations provided in the k-th network and spatial separation compensation correction information combined based on the master reference station of the k-th network and distance information of a user's terminal.

In accordance with an aspect, the user's virtual observation generator may generate the user's virtual observation by summing the carrier measurement of the master reference station of the first network and the spatial separation compensation correction information of each of the at least one network.

In accordance with an aspect, the n-th network may be provided with one master reference station and at least two auxiliary reference stations, wherein at least two reference stations of the master reference station and at least two auxiliary reference stations provided in the n-th network may be shared with an n−1-th network.

In accordance with another aspect of the present invention, there is provided a method of generating a user's virtual observation, the method including: by a master reference station carrier observation receiver, receiving a carrier measurement of a master reference station of a first network from a preset area divided into a first network to an n-th network (where n is a positive integer) by multiple reference stations; by a spatial separation compensation correction information receiver, setting a path from the master reference station of the first network to a user's terminal, and receiving spatial separation compensation correction information of at least one network corresponding to the set path among the first network to the n-th network; and by a user's virtual observation generator, generating a virtual observation corresponding to positioning of the user's terminal using the carrier measurement of the master reference station of the first network and the spatial separation compensation correction information of each of the at least one network.

In accordance with an aspect, in the receiving of the spatial separation compensation correction information, the spatial separation compensation correction information receiver may receive spatial separation compensation correction information of each of the first network to the k-th network when the user's terminal is positioned on a k-th network (where k is a positive integer satisfying 1<k≤n) of the first network to the n-th network.

In accordance with an aspect, in the receiving of the spatial separation compensation correction information, the spatial separation compensation correction information receiver may receive spatial separation compensation correction information of each of the first network to the k−1-th network and may apply spatial separation compensation correction information combined based on positioning information of a master reference station shared in each of the first network to the k−1-th network, and a spatial separation compensation correction information applier may generate a carrier's virtual observation based on user's positioning by applying spatial separation compensation correction information combined based on the user's positioning information in the k-th network.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the scope of rights according to the concept of the present invention.

It will be understood that when an element is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" in the specification should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments of the invention are shown. This disclosure may, however, be embodied in many different forms and should not be construed as limited to the exemplary embodiments set forth herein. Like reference numerals in the drawings denote like elements.

Figure 1:
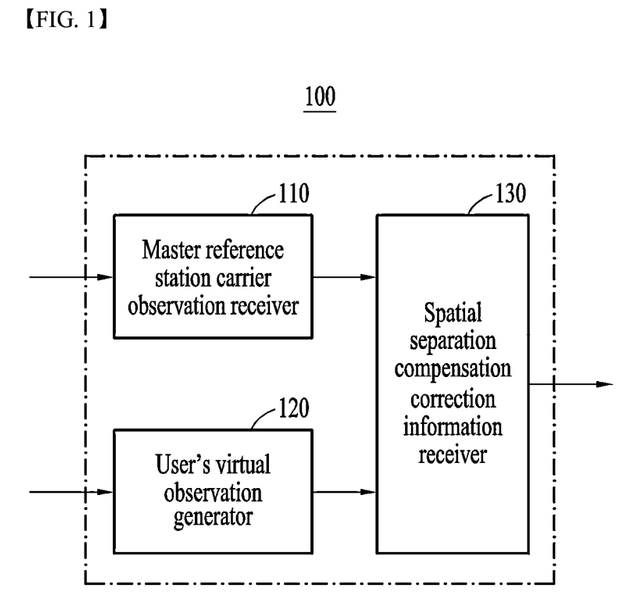
FIG. 1 illustrates a user's virtual observation generation apparatus according to an embodiment.

FIG. 1 illustrates a user's virtual observation generation apparatus according to an embodiment.

Referring to FIG. 1, a user's virtual observation generation apparatus 100 according to an embodiment may generate user's virtual observations in which a spatial separation error is compensated based on a hybrid-type HN-RTK (homogeneous network RTK) wherein the advantages of existing OSR and SSR methods are combined in consideration of a satellite-based nationwide precise positioning service.

In addition, the user's virtual observation generation apparatus 100 may generate user's virtual observations, in which a spatial separation error is compensated, in the entire service area only with a carrier measurement of one master reference station and spatial separation compensation correction information based on HN-RTK.

In addition, the user's virtual observation generation apparatus 100 may minimize an initialization process according to the occurrence of a handover based on HN-RTK and a consequent delay time.

Specifically, the user's virtual observation generation apparatus 100 may utilize three-dimensional reference station coordinates constituting the entire network provided with HN-RTK correction information to constitute a path from the master reference station to a user as a combination of reference stations included in a network. That is, the user's virtual observation generation apparatus 100 may set a baseline, in which a starting point is a main reference station, an end point is a user, and a path point is a reference station included in the network, to compensate for a spatial separation error between the master reference station and the user carrier measurement.

Next, the user's virtual observation generation apparatus 100 may calculate and adjust the spatial separation error correction information for all baselines by leveling observations of the master reference station among network RTK correction information generated in different networks. Through this, a spatial separation error occurring due to a measurement difference between the reference station and a user's terminal may be compensated by applying the adjusted HN-RTK correction information to user's virtual observations or reference station observations shared between networks.

For this, the user's virtual observation generation apparatus 100 may include a master reference station carrier observation receiver 110, a spatial separation compensation correction information receiver 120, and a user's virtual observation generator 130. For example, the user's virtual observation generation apparatus 100 may be provided in a user's terminal.

The master reference station carrier observation receiver 110 according to an embodiment may receive a carrier measurement of a master reference station of a first network from a preset area divided into a first network to an n-th network (where n is a positive integer) by multiple reference stations.

In accordance with an aspect, the entire network (the first network to the n-th network) is a network based on HN-RTK according to an embodiment, and each network thereof may be constituted of a master reference station and at least two auxiliary reference stations. A master reference station of the first network may serve as a master reference station of the entire network (the first network to the n-th network), i.e., the HN-RTK-based network.

In addition, at least two reference stations among one master reference station and at least two auxiliary reference stations included in the n-th network may be shared with an n−1-th network.

Here, the master reference station carrier observation is a distance measurement value between the satellite and the reference station. Since the master reference station carrier observation includes an unspecified term expressed as a product of a carrier wave wavelength, it may be used as a distance measurement value between the satellite and the receiver when the carrier wave wavelength is accurately determined. In addition, the master reference station carrier observation is robust to multipath errors and the receiver noise is very small (1/100th of the pseudorange measurement), the receiver position based on the carrier measurement has the characteristic that it is very precise compared to that using the pseudorange. If the unspecified number of the carrier measurement can be determined, high-precision positioning information at the mm to cm level can be obtained, so it can be mainly used in geodetic and surveying fields that require high accuracy.

The spatial separation compensation correction information receiver 120 according to an embodiment may set a path from the main reference station of the first network to the user's terminal and may receive the spatial separation compensation correction information of at least one network corresponding to the set path among the first to n-th networks.

For example, the spatial separation compensation correction information of at least one network may be spatial separation compensation correction information generated based on Network RTK in at least one reference station among multiple reference stations constituting each network.

In accordance with an aspect, when the user's terminal is positioned on a k-th network (where k is a positive integer satisfying 1<k≤n) among the first network to the n-th network, the spatial separation compensation correction information receiver 120 may receive spatial separation compensation correction information of each of the first network to the k-th network.

Specifically, the spatial separation compensation correction information receiver 120 may receive spatial separation compensation correction information combined based on positioning information of a master reference station in a k−1-th network as spatial separation compensation correction information of the k−1-th network.

In addition, the spatial separation compensation correction information receiver 120 may receive spatial separation compensation correction information combined based on user's positioning information in the k-th network as spatial separation compensation correction information of the k-th network.

In accordance with an aspect, the spatial separation compensation correction information of the k−1-th network may be spatial separation compensation correction information combined based on inclination information and distance information between the master reference station of the k−1-th network and multiple auxiliary reference stations provided in the k−1-th network.

In addition, the spatial separation compensation correction information of the k-th network may be spatial separation compensation correction information combined based on inclination information between a master reference station of the k-th network and multiple auxiliary reference stations provided in the k-th network and distance information between the master reference station of the k-th network and the user's terminal.

The user's virtual observation generator 130 according to an embodiment may generate a user virtual observation, in which a spatial separation error is compensated, of the user's terminal using the carrier measurement of the master reference station of the first network and spatial separation compensation correction information of each of at least one network.

Here, the spatial separation error is mainly composed of the spatial separation error with respect to the satellite orbit, the ionospheric spatial separation error, and the tropospheric spatial separation error, and the size thereof ranges from several tens of cm to several m. In general, if the residual after double difference of the carrier measurement has a size of ½ or more of the length of the carrier wave, the probability of determining an unspecified number falls sharply. The spatial separation error of up to several m acts as a major cause of degrading the unspecified determination performance of the L1 and L2 carriers with wavelengths of about 19 cm and 24 cm, respectively.

In accordance with an aspect, the user's virtual observation generator 130 may generate a user's virtual observation by summing the carrier measurement of the master reference station of the first network and the spatial separation compensation correction information of each of at least one network.

A process of generating user's virtual observations by the user's virtual observation generation apparatus 100 according to an embodiment will be described in more detail with reference to FIGS. 2A to 2B in the following embodiments.

Figure 2A:
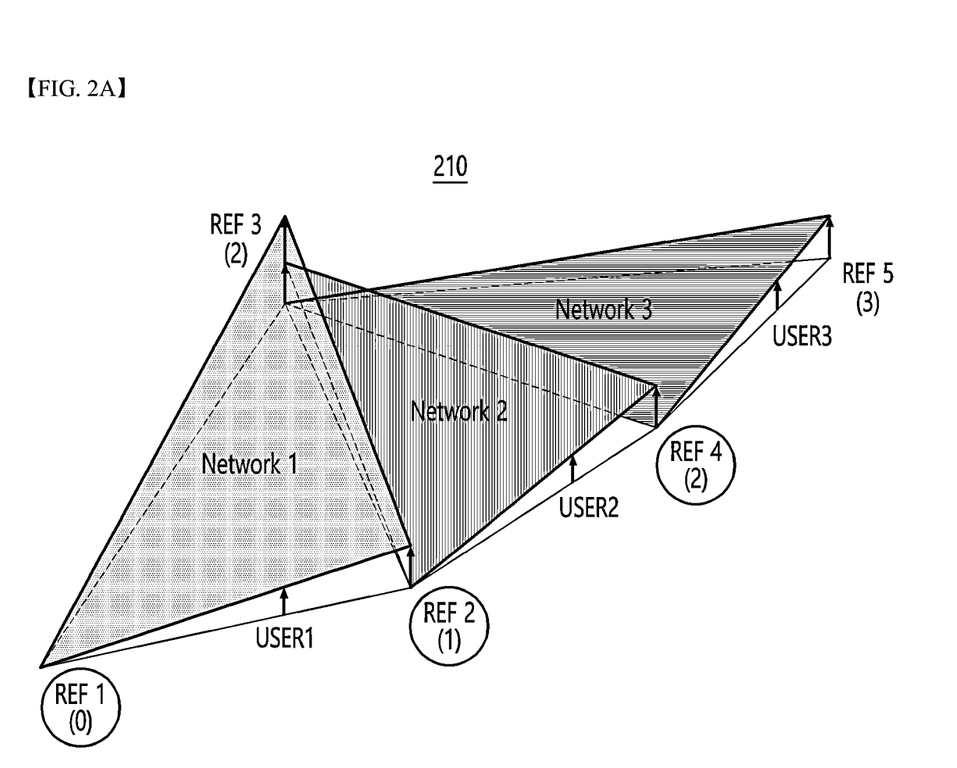
FIGS. 2A and 2B are drawing for explaining HN-RTK according to an embodiment.
Figure 2B:
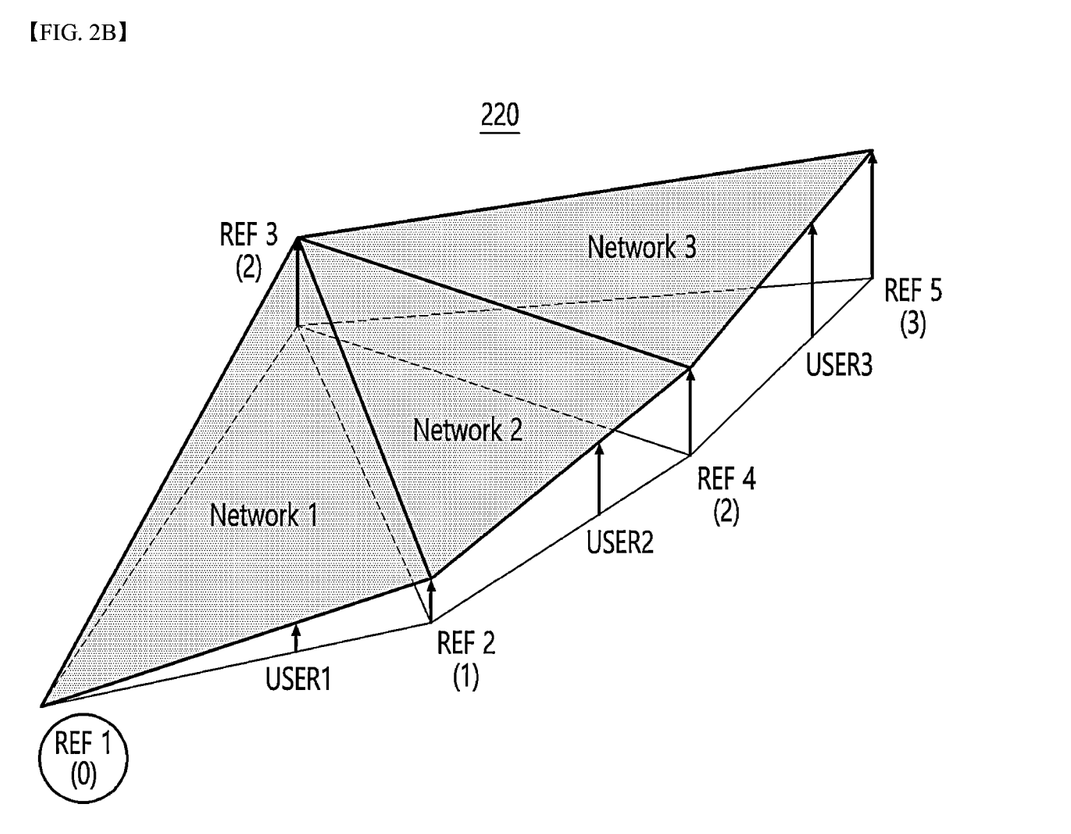

FIGS. 2A and 2B are diagrams for explaining an HN-RTK according to an embodiment.

Referring to FIGS. 2A and 2B, reference numeral 210 denotes a discrete GNSS error plane based on a general Network RTK, and reference numeral 220 denotes a continuous GNSS error plane based on HN-RTK according to an embodiment.

In reference numerals 210 and 220, REF means a GNSS reference station, numerical values in parentheses '( )' written in REF mean a GNSS error amount at the location of the reference station, and USER means a user (i.e., a user's terminal).

In addition, in reference numerals 210 and 220, the error plane may consist of three reference station networks (Network 1 to Network 3) consisting of five GNSS reference stations (REF 1 to REF 5), and each network may include one master reference station and two auxiliary reference stations.

Hereinafter, the entire network (the first network to the n-th network) will be described as three networks, i.e., the first network (Network 1), the second network (Network 2), and the third network (Network 3), but a network according to an embodiment is not limited thereto and may consist of four or more networks.

According to reference numeral 210, assuming that the user's terminals (User 1 to User 3) are located inside the reference station network, a Flachen Korrektur Parameter (FKP) or Master-Auxiliary Concept (MAC)-based Network Real Time Kinematic (RTK) user's terminal may compensate for the spatial separation error between the user and the reference station by using the FKP or MAC correction information generated in the reference station network to which it belongs and the observations of the master reference station.

That is, each of the first to third user's terminals (User 1 to User 3) may compensate for a spatial separation error occurring due to a difference between the carrier measurement ($\Phi_{REF\ 1}$, $\Phi_{REF\ 2}$, $\Phi_{REF\ 4}$) of the master reference station (REF 1, REF 2, REF 4) of each network and a carrier measurement received by a user's receiver (i.e., a user's terminal) by utilizing carrier spatial separation compensation correction information ($\delta\Phi_{NRTK_{USER1}}^{NET1}$, $\delta\Phi_{NRTK_{USER2}}^{NET2}$, $\delta\Phi_{NRTK_{USER3}}^{NET3}$) generated based on the network RTK correction information of the first to third networks (Network 1 to Network 3) in which each user's terminal is located.

In other words, each of the first to third user's terminals (User 1 to User 3) may generate a user carrier virtual observation ($\hat{\Phi}_{USER1}$, $\hat{\Phi}_{USER2}$, $\hat{\Phi}_{USER3}$), in which a spatial separation error is compensated, using Equation 1 below, and may calculate precise positioning by differentiating the user carrier virtual observation from the carrier measurement received by the user.

$$\hat{\Phi}_{USER1} = \Phi_{REF1} + \delta\Phi_{NRTK_{USER1}}^{NET1}$$

$$\hat{\Phi}_{USER2} = \Phi_{REF2} + \delta\Phi_{NRTK_{USER2}}^{NET2}$$

$$\hat{\Phi}_{USER3} = \Phi_{REF4} + \delta\Phi_{NRTK_{USER3}}^{NET3} \quad \text{[Equation 1]}$$

More specifically, each of the first to third user's terminals (User 1 to User 3) may generate a user carrier virtual observation ($\hat{\Phi}_{USER1}$, $\hat{\Phi}_{USER2}$, $\hat{\Phi}_{USER3}$), in which a spatial separation error is compensated, using Equation 2 below when the network RTK correction information is FKP correction information. Here, the FKP method may compensate for a spatial separation error of user's virtual observations using the slope of the ionospheric and non-ionospheric error planes modeled in two dimensions as shown in reference numeral 210 and master reference station carrier measurements.

$$\hat{\Phi}_{USER1} = \Phi_{REF1} + \delta\Phi_{FKP_{USER1}}^{NET1}$$

$$\hat{\Phi}_{USER2} = \Phi_{REF2} + \delta\Phi_{FKP_{USER2}}^{NET2}$$

$$\hat{\Phi}_{USER3} = \Phi_{REF4} + \delta\Phi_{FKP_{USER3}}^{NET3} \quad \text{[Equation 2]}$$

In addition, each of the first to third user's terminals (User 1 to User 3) may generate a user carrier virtual observation ($\hat{\Phi}_{USER1}$, $\hat{\Phi}_{USER2}$, $\hat{\Phi}_{USER3}$) in which a spatial separation error is compensated using Equation 3 below when network RTK correction information is MAC correction information. Here, the MAC method divides spatial separation error correction information into ionospheric and non-ionospheric components as in FKP, but may provide the difference of observation errors between master-auxiliary reference stations to a user's terminal, not the inclination information of an error plane.

That is, unlike the FKP method, the user's terminal receives correction information in a raw form that is not processed or modeled, so the user's terminal may proactively compensate for a spatial separation error.

For example, the first user's terminal (User 1) may utilize carrier error correction information ($\delta\Phi_{MAC_{USER1}}^{NET1}$) interpolated to match the positioning of the first user's terminal (User 1) based on MAC correction information on the second reference station (REF 2) and third reference station (REF 3) which are auxiliary reference stations of the first MAC network (Network 1) to compensate for a spatial separation error occurring due to a difference between the carrier measurement ($\Phi_{REF\ 1}$) of the master reference station (REF 1) and the carrier measurement received by the user's receiver.

$$\hat{\Phi}_{USER1} = \Phi_{REF1} + \delta\Phi_{MAC_{USER1}}^{NET1}$$

$$\hat{\Phi}_{USER2} = \Phi_{REF2} + \delta\Phi_{MAC_{USER2}}^{NET2}$$

$$\hat{\Phi}_{USER3} = \Phi_{REF4} + \delta\Phi_{MAC_{USER3}}^{NET3} \quad \text{[Equation 3]}$$

As such, in the FKP or MAC-based network RTK method, since user's terminals located in different networks use different master reference station observations and network RTK correction information, the reference station networks are inevitably operated independently of each other.

As a result, the network RTK user's terminal should perform RTK-based precise positioning by utilizing the network RTK correction information generated in the network to which it belongs and the master reference station observation of the network each time. Accordingly, when the user's terminal moves from the initial network to another network (e.g., the first user's terminal (User 1) moves from the first network (Network 1) to the second network (Network 2)), the handover phenomenon wherein the master reference station and a network RTK correction information generation network are changed occurs, so that a problem in which the carrier's unspecified number of the reference station needs to be re-determined may occur. If the unspecified number is not re-determined within a short time when the handover occurs, the network RTK-based precision positioning performance may deteriorate.

To address such problems, the user's virtual observation generation apparatus according to an embodiment may compensate for the spatial separation error based on the continuous GNSS error plane according to the HN-RTK shown in reference numeral 220.

According to reference numeral 220, adjacent GNSS error planes are regarded as discontinuous in the network RTK system, but in HN-RTK, adjacent error planes are regarded as one continuous plane rather than independent of each other as shown in FIG. 2B. Accordingly, even for user's terminals positioned in different networks, a carrier's virtual observation of each user's terminal may be represented by only one master reference station observation.

For example, in the entire HN-RTK-based network (Network 1 to Network 3), the first reference station (REF 1), which is a master reference station of the first network (Network 1), may be used as a single master reference station of the entire network.

That is, the user's virtual observation generation apparatus based on HN-RTK may generate user's virtual observations ($\hat{\Phi}_{USER2}$, $\hat{\Phi}_{USER3}$), in which a spatial separation error is compensated, for the second user's terminal (User 2) positioned on the second network (Network 2) and the third user's terminal (User 3) positioned on the third network (Network 3) only using the carrier measurement ($\Phi_{REF\ 1}$) of the first reference station (REF 1) that is a single master reference station of the HN-RTK-based network, not the carrier measurement ($\Phi_{REF\ 2}$, $\Phi_{REF\ 4}$) of the master reference station (REF 2, REF 4) of each network.

In other words, the user's virtual observation generation apparatus may generate the user's virtual observation ($\hat{\Phi}_{USER2}$) of the second user's terminal (User 2), in which a spatial separation error is compensated, by summing the carrier measurement ($\Phi_{REF\ 1}$) of the first reference station (REF 1) and the spatial separation compensation correction information ($\delta\Phi_{HNRTK_{REF2}}^{NET1}$, $\delta\Phi_{HNRTK_{USER2}}^{NET2}$) of the first and second networks corresponding to the path that is set from the first reference station (REF 1) to the second user's terminal (User 2) as in Equation 4 below.

$$\hat{\Phi}_{USER2} = \hat{\Phi}_{REF2} + \delta\Phi_{HNRTK_{USER2}}^{NET2}$$

$$= (\Phi_{REF1} + \delta\Phi_{HNRTK_{REF2}}^{NET1}) + \delta\Phi_{HNRTK_{USER2}}^{NET2} \quad \text{[Equation 4]}$$

Here, the spatial separation compensation correction information ($\delta\Phi_{HNRTK_{REF2}}^{NET1}$) of the first network means correction information combined based on the inclination information and distance information between the master reference station of the first network (REF 1) and the second reference station (REF 2), and the carrier correction information ($\delta\Phi_{HNRTK_{USER2}}^{NET2}$) of the second network means correction information combined based on the spatial separation compensation inclination information obtained from reference stations of the second network and the distance information between the master reference station (REF 2) and the second user's terminal (User 2).

In addition, the user's virtual observation generation apparatus may generate the user's virtual observation ($\hat{\Phi}_{USER3}$) of the third user's terminal (User 3), in which a spatial separation error is compensated, by applying the carrier measurement ($\Phi_{REF\ 1}$) of the first reference station (REF 1) and the spatial separation compensation correction information ($\delta\Phi_{HNRTK_{REF2}}^{NET1}$, $\delta\Phi_{HNRTK_{REF4}}^{NET2}$, $\delta\Phi_{HNRTK_{USER3}}^{NET3}$) of the first network, second network, and third network corresponding to the path that is set from the first reference station (REF 1) to the third user's terminal (User 3) as in Equation 5 below.

$$\hat{\Phi}_{USER3} = \hat{\Phi}_{REF4} + \delta\Phi_{HNRTK_{USER3}}^{NET3} \quad \text{[Equation 5]}$$

$$= \hat{\Phi}_{REF2} + \delta\Phi_{HNRTK_{REF4}}^{NET2} + \delta\Phi_{HNRTK_{USER3}}^{NET3}$$

$$\{(\Phi_{REF1} + \delta\Phi_{HNRTK_{REF2}}^{NET1}) + \delta\Phi_{HNRTK_{REF4}}^{NET2}\} +$$

$$\delta\Phi_{HNRTK_{USER3}}^{NET3}$$

Here, the spatial separation compensation correction information ($\delta\Phi_{HNRTK_{REF4}}^{NET2}$) of the second network means correction information combined based on the inclination information and distance information between the master reference station (REF 2, REF 3) of the second network and the auxiliary reference station (REF 3, REF 4) of the second network, and the carrier correction information ($\delta\Phi_{HNRTK_{USER3}}^{NET3}$) of the third network means correction information combined based on the inclination information between the master reference station (REF 4) of the third network and the auxiliary reference station (REF 3, REF 5) of the third network and the distance information between the master reference station (REF 4) of the third network and the third user's terminal (User 3).

Equations 4 and 5 described above mean that any reference station carrier measurement constituting the user's terminal inside the reference station network or the network may be reconstructed by adjusting only one master reference station measurement and a plurality of FKP correction information. This can be mathematically expressed as Equation 6 below.

$$\hat{\Phi}_{USER} = \Phi_{REF1} + \sum_{k=1}^{m} \delta\Phi_{HNRTK^{NET(k)}} \quad \text{[Equation 6]}$$

In other words, the user's virtual observation generation apparatus according to an embodiment combines the spatial separation correction information ($\delta\Phi_{HNRTK}^{NET(k)}$) of the network, which corresponds to a path that is set from the master reference station to the user's terminal based on the carrier measurement ($\Phi_{REF\ 1}$) of the master reference station, in the form of a chain to generate a user's virtual observation in which a spatial separation error is compensated ($\hat{\Phi}_{USER}$), thereby being capable of minimizing problems caused by handover.

FIGS. 3A to 3D illustrate the performance test results of a user's virtual observation generation apparatus according to an embodiment.

Referring to FIGS. 3A to 3D, reference numeral 310 illustrates an arrangement of reference stations and user's terminals (User) selected for a performance test of the user's virtual observation generation apparatus according to an embodiment, and reference numerals 320 to 340 illustrate a double-differenced phase residual between a carrier measurement, received by an L1/E1/B1 user receiver, and a generated virtual observation in first to third preset cases, respectively.

Here, the master and auxiliary reference stations for each network are summarized in Table 1 below.

TABLE 1

| Network ID | Master Station | Auxiliary Station |
|---|---|---|
| 1 | CHNG | GOJE/WSJG |
| 2 | YECH | YDKG/CHNG |
| 3 | YEOJ | HONC/YECH |
| 4 | CHUL | GANH/YEOJ |

Referring to reference numerals 310 to 340, the performance tests of the user's virtual observation generation apparatus were carried out by a static experiment of utilizing dual frequency GPS (L1/L2), Galileo (E1/E5), and BeiDou (B1/B2) observation data collected for about 4 hours from 11:30 on Oct. 29, 2021 from Geoje Reference Station (GOJE), Ulsan Jung-gu Reference Station (WSJG), Changnyeong Reference Station (CHNG), Yeongdeok Gang-gu Reference Station (YDKG), Yecheon Reference Station (YECH), Hongcheon Reference Station (HONC), Seoyeoju Reference Station (YEOJ), Cheorwon Reference Station (CHUL), and Ganghwa Reference Station (GANH) operated by the National Geographic Information Service.

Figure 3A:
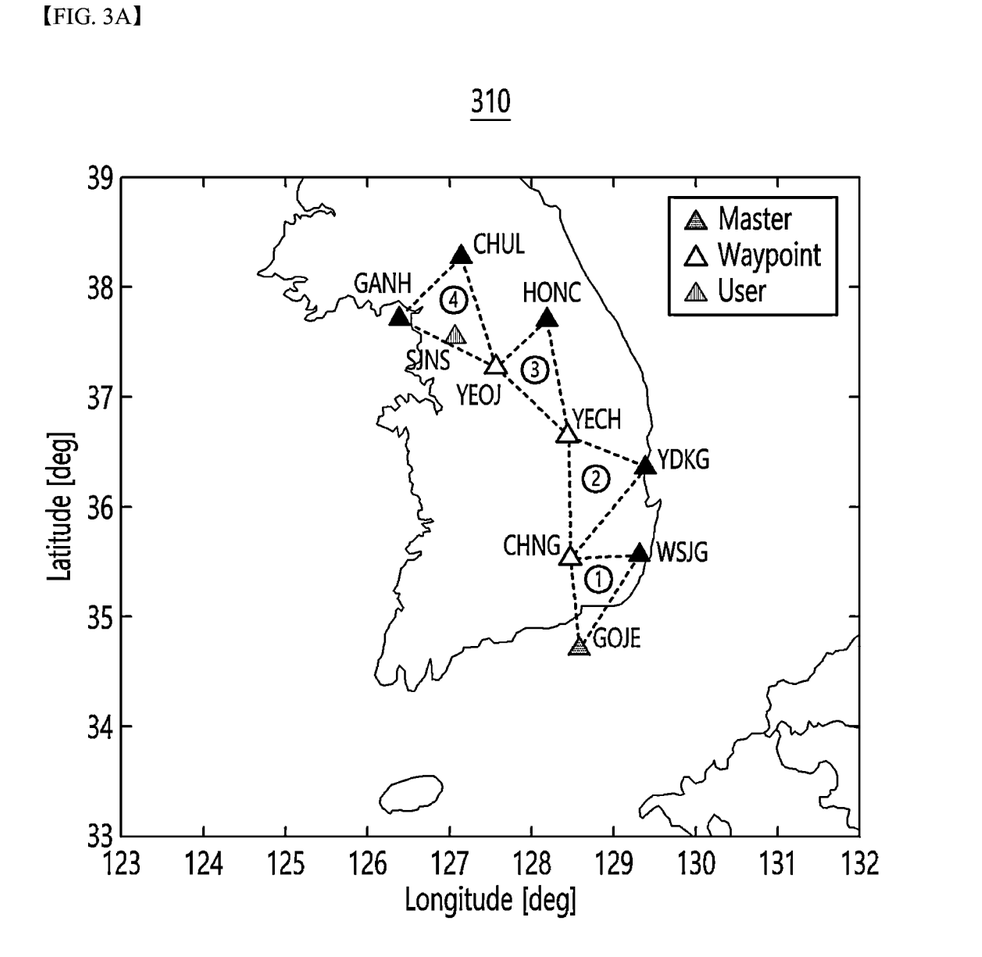
FIGS. 3A to 3D illustrate the performance test results of a user's virtual observation generation apparatus according to an embodiment.

In the tests, the HN-RTK master reference station was set as Geoje Reference Station, and the user's terminal (SJNS) was set as a FlexPak6 receiver, manufactured by NovAtel, installed in Chungmu-gwan of Sejong University. Homogeneous network RTK correction information for a total of 4 networks was generated using data from a total of 9 reference stations, and this was used for verification.

In the tests, FKP-based HN-RTK correction information was generated for performance comparison with the FKP-based network RTK service in service in Korea, but any types of network RTK correction information, as well as FKP and MAC, may be applied.

Figure 3B:
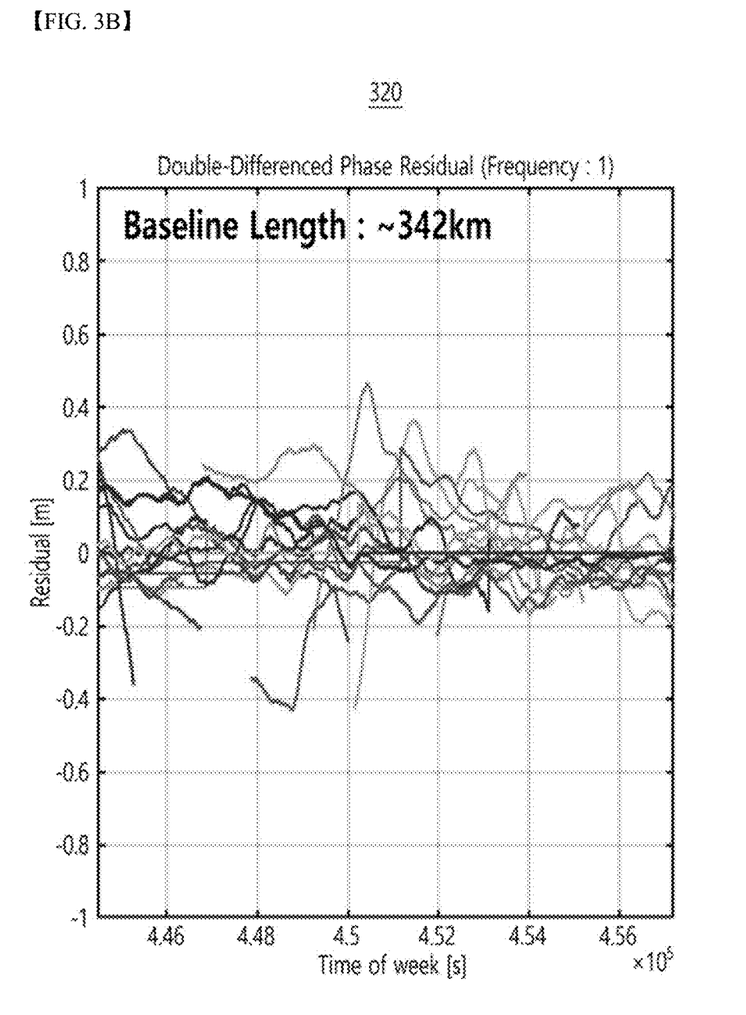
Figure 3C:
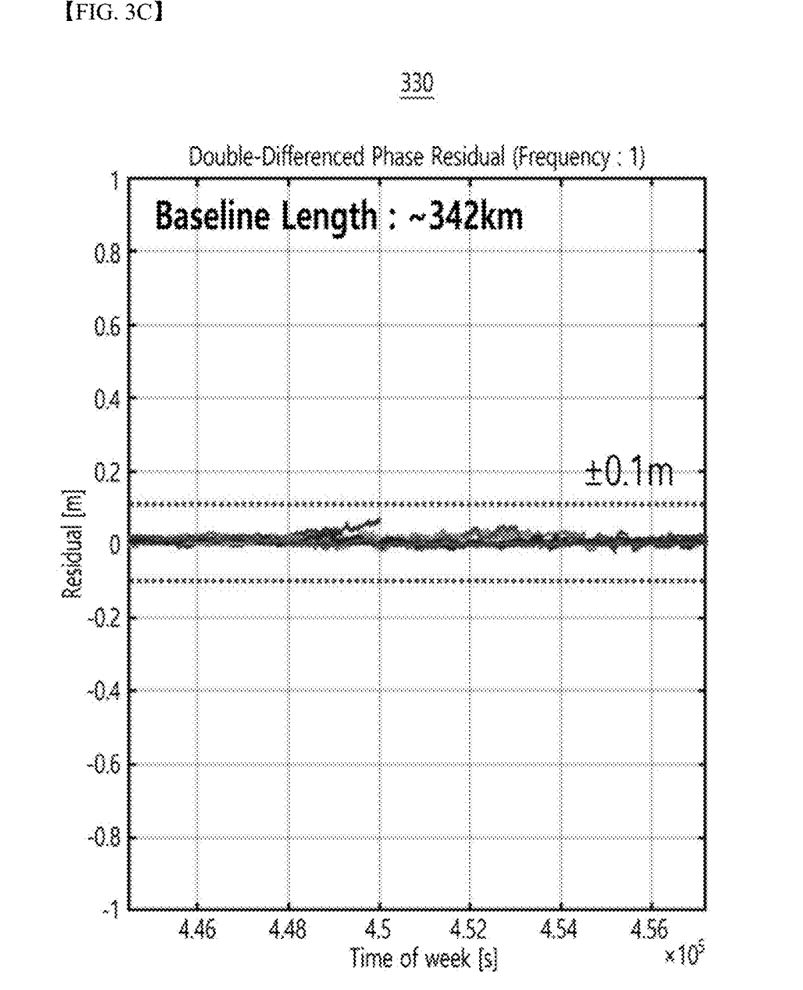
Figure 3D:
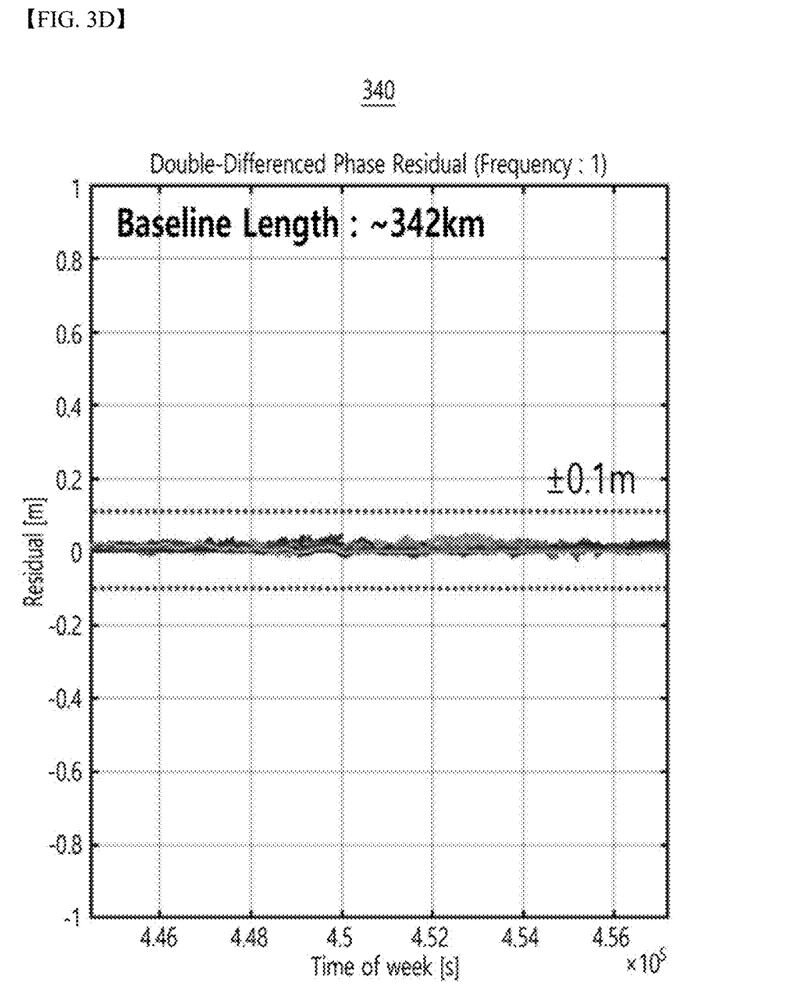

In addition, a first case corresponding to reference numeral 320 denotes a case in which a double-differenced phase residual between the Geoje Reference Station and a user carrier measurement is analyzed in a state where no correction information is applied, a second case corresponding to reference numeral 330 denotes a case in which HN-RTK spatial separation compensation correction information generated in a total of 4 networks is continuously applied to the same master reference station measurement as the first case as shown in Equation 7 below, and a third case corresponding to reference numeral 340 denotes a case in which FKP correction information generated in Seoyeoju Reference Station network No. 4 is applied as shown in Equation 8 below, which means a general Network RTK method.

Examining Equation 7, first, the observation ($\hat{\Phi}_{CHNG}$) of Changnyeong Reference Station may be reconstituted by using the observation ($\Phi_{GOJE}$) of the master reference station, Geoje Reference Station, and the HN-RTK spatial separation compensation correction information ($\delta\Phi_{HNRTK_{CHNG}}^{NET1}$) generated in network No. 1.

Next, the observation ($\hat{\Phi}_{YECH}$) of Yecheon Reference Station may be reconstituted by using the reconstituted Changnyeong Reference Station observation and the HN-RTK correction information ($\delta\Phi_{HNRTK_{YECH}}^{NET2}$) of network No. 2, and finally, Seoyeoju Reference Station observation ($\hat{\Phi}_{YEOJ}$) may be reconstituted by applying the HN-RTK correction information ($\delta\Phi_{HNRTK_{YEOJ}}^{NET3}$) of network No. 3.

As a result, it can be confirmed that the second case to which the HN-RTK correction information generated from the four networks adjacent to Geoje Reference Station is applied is mathematically the same as the third case wherein the HN-RTK spatial separation compensation correction information of network No. 4 is applied to Seoyeoju Reference Station observation.

Referring to reference numerals 320 to 340, in the first case, since the baseline distance between the user's terminal and the reference station reached about 342 km and no correction information was applied, the magnitude of the carrier difference residual is relatively larger than that of the second and third cases and is up to about 0.5 m levels.

On the other hand, in the second case, it was confirmed that, as the HN-RTK spatial separation compensation correction information generated in multiple networks is continuously applied despite the fact that the baseline distance between the user and the reference station is the same as that of the first case, the magnitudes of the residuals for all satellites were significantly reduced to within 0.1 m and the RMS value was reduced to 1/10 level compared to 0.1111 m of the first case.

In addition, as can be seen through Equations 7 and 8, the second case is mathematically the same as the third case, and the RMS values of the residuals of the two cases are 0.0119 m and 0.0128 m, respectively, confirming that the magnitudes and trends of the actual measured residuals are almost the same.

This is the result of proving that observations of Seoyeoju Reference Station can be reconstructed by continuously applying the HN-RTK correction information of the network adjacent to the master reference station, Geoje Reference Station.

Figure 4:
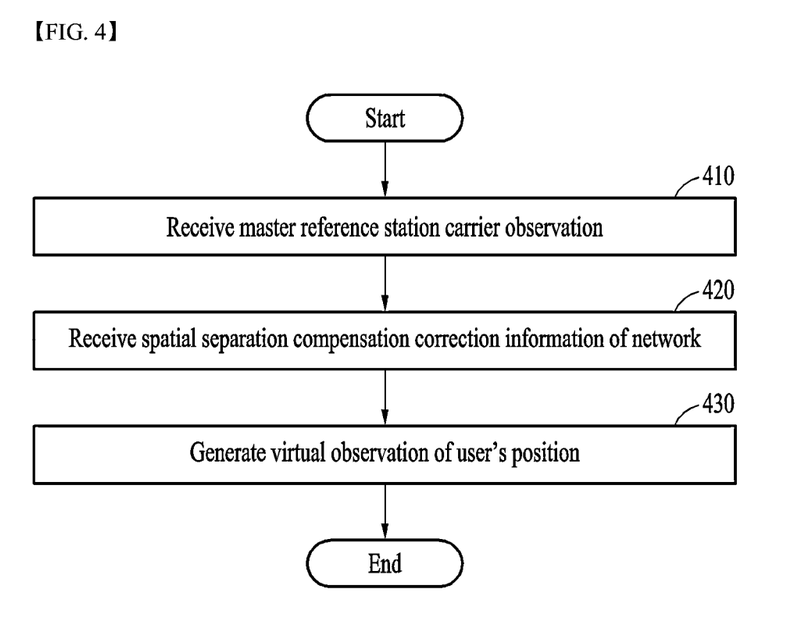
FIG. 4 illustrates a method of generating a user's virtual observation.

FIG. 4 illustrates a method of generating a user's virtual observation.

[Equation 7]

$$\hat{\Phi}_{SJNS} = \Phi_{GOJE} + \sum_{k=1}^{4} \delta\Phi_{HNRTK}^{NETk}$$

$$= \left(\Phi_{GOJE} + \delta\Phi_{HNRTK_{CHNG}}^{NET1}\right) + \sum_{k=2}^{4} \delta\Phi_{HNRTK}^{NETk} = \hat{\Phi}_{CHNG} + \sum_{k=2}^{4} \delta\Phi_{HNRTK}^{NETk}$$

$$= \left(\hat{\Phi}_{CHNG} + \delta\Phi_{HNRTK_{YECH}}^{NET2}\right) + \sum_{k=3}^{4} \delta\Phi_{HNRTK}^{NETk} = \hat{\Phi}_{YECH}^{s} + \sum_{k=3}^{4} \delta\Phi_{HNRTK}^{NETk}$$

$$= \left(\hat{\Phi}_{YECH} + \delta\Phi_{HNRTK_{YEOJ}}^{NET3}\right) + \sum_{k=4}^{4} \delta\Phi_{HNRTK}^{NETk} = \hat{\Phi}_{YEOJ} + \sum_{k=4}^{4} \delta\Phi_{HNRTK}^{NETk}$$

$$= \hat{\Phi}_{YEOJ} + \delta\Phi_{HNTRK_{SJNS}}^{NET4}$$

[Equation 8]

$$\hat{\Phi}_{SJNS} = \hat{\Phi}_{YEOJ} + \delta\Phi_{FKP_{SJNS}}^{NET4}$$

In other words, FIG. 4 is a view for explaining an operation method of the user's virtual observation generation apparatus according to an embodiment described with reference to FIGS. 1 to 3D. A description that overlaps with the contents described above will be omitted.

Referring to FIG. 4, in step 410, a master reference station carrier observation receiver may receive a carrier measurement of a master reference station of a first network from a preset area divided into a first network to an n-th network (where n is a positive integer) by multiple reference stations.

Next, in step 420, a carrier spatial separation compensation correction information receiver may set a path from the master reference station of the first network to a user's terminal and may receive spatial separation compensation correction information of at least one network corresponding to a set path among the first network to the n-th network.

In accordance with an aspect, in step 420, a spatial separation compensation correction information receiver may receive spatial separation compensation correction information of each of the first network to the k-th network when the user's terminal is positioned on a k-th network (where k is a positive integer satisfying 1<k≤n) among the first network to the n-th network.

In accordance with an aspect, in step 420, the spatial separation compensation correction information receiver may receive spatial separation compensation correction information, combined based on positioning information of a master reference station of each of the second network to the k−1-th network, as spatial separation compensation correction information of each of the second network to the k−1-th network and may receive spatial separation compensation correction information, combined based on user's positioning information in the k-th network, as spatial separation compensation correction information of the k-th network.

Next, in step 430, a user's virtual observation generator may generate a user virtual observation, in which a spatial separation error is compensated, of the user's terminal using the carrier measurement of the master reference station of the first network and the spatial separation compensation correction information of each of at least one network.

In conclusion, by using the present disclosure, user's virtual observations in which a spatial separation error is compensated based on a hybrid-type HN-RTK (homogeneous network RTK) wherein the advantages of existing OSR and SSR methods are combined in consideration of a satellite-based nationwide precise positioning service can be generated.

In addition, by using the present disclosure, user's virtual observations in which a spatial separation error is compensated can be generated only with a carrier measurement of one reference station based on HN-RTK.

In addition, by using the present disclosure, an initialization process according to the occurrence of a handover based on HN-RTK and a consequent delay time can be minimized.

In accordance with an embodiment, the present disclosure can generate user's virtual observations in which a spatial separation error is compensated based on a hybrid-type HN-RTK (homogeneous network RTK) wherein the advantages of existing OSR and SSR methods are combined in consideration of a satellite-based nationwide precise positioning service.

In accordance with an embodiment, the present disclosure can generate user's virtual observations in which a spatial separation error is compensated only with a carrier measurement of one reference station based on HN-RTK.

In accordance with an embodiment, the present disclosure can minimize an initialization process according to the occurrence of a handover based on HN-RTK and a consequent delay time.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

DESCRIPTION OF SYMBOLS

100: user's virtual observation generation apparatus
110: master reference station carrier observation receiver
120: spatial separation compensation correction information receiver
130: user's virtual observation generator

What is claimed is:

1. An apparatus for generating user's virtual observation, comprising:
   a master reference station carrier observation receiver configured to receive a carrier measurement of a master reference station of a first network from a preset area divided into a first network to an n-th network (where n is a positive integer) by multiple reference stations;
   a spatial separation compensation correction information receiver configured to set a path from the master reference station of the first network to a user's terminal and to receive spatial separation compensation correction information of at least one network corresponding to the set path among the first network to the n-th network; and
   using a user's virtual observation generator configured to generate a user's virtual observation of the user's terminal, in which a spatial separation error is compensated, using the carrier measurement of the master reference station of the first network and the spatial separation compensation correction information of each of the at least one network.

2. The apparatus according to claim 1, wherein, when the user's terminal is positioned on a k-th network (where k is a positive integer satisfying 1<k≤n) among the first network to the n-th network, the master reference station carrier observation receiver receives a master reference station carrier observation of each of the first network to the k-th network.

3. The apparatus according to claim 2, wherein the spatial separation compensation correction information receiver receives spatial separation compensation correction information based on positioning information of a master reference station of the k−1-th network as spatial separation compensation correction information of the k−1-th network, and receives spatial separation compensation correction information combined based on positioning information of the user's terminal in the k-th network as spatial separation compensation correction information of the k-th network.

4. The apparatus according to claim 3, wherein the spatial separation compensation correction information of the k−1-th network is carrier correction information combined based on inclination information and distance information between multiple auxiliary reference stations provided in the master reference station of the k−1-th network and the k−1-th network.

5. The apparatus according to claim 3, wherein the spatial separation compensation correction information of the k-th network is inclination information between the master reference station of the k-th network and multiple auxiliary reference stations provided in the k-th network and spatial separation compensation correction information combined based on the master reference station of the k-th network and distance information of a user's terminal.

6. The apparatus according to claim 1, wherein the user's virtual observation generator generates the user's virtual observation by summing the carrier measurement of the master reference station of the first network and the spatial separation compensation correction information of each of the at least one network.

7. The apparatus according to claim 1, wherein the n-th network is provided with one master reference station and at least two auxiliary reference stations, wherein at least two reference stations of the master reference station and at least two auxiliary reference stations provided in the n-th network are shared with an n−1-th network.

8. A method of generating a user's virtual observation, the method comprising:
by a master reference station carrier observation receiver, receiving a carrier measurement of a master reference station of a first network from a preset area divided into a first network to an n-th network (where n is a positive integer) by multiple reference stations;
by a spatial separation compensation correction information receiver, setting a path from the master reference station of the first network to a user's terminal, and receiving spatial separation compensation correction information of at least one network corresponding to the set path among the first network to the n-th network; and
by a user's virtual observation generator, compensating a user measurement spatial separation error of the user's terminal using the carrier measurement of the master reference station of the first network and the spatial separation compensation correction information of each of the at least one network.

9. The method according to claim 8, wherein in the receiving of the spatial separation compensation correction information, the spatial separation compensation correction information receiver receives spatial separation compensation correction information of each of the first network to the k-th network when the user's terminal is positioned on a k-th network (where k is a positive integer satisfying 1<k≤n) of the first network to the n-th network.

10. The method according to claim 9, wherein in the receiving of the spatial separation compensation correction information, the spatial separation compensation correction information receiver receives spatial separation compensation correction information combined based on positioning information of a master reference station of each of the second network to the k−1-th network as spatial separation compensation correction information of each of the second network to the k−1-th network, and
the spatial separation compensation correction information receiver receives spatial separation compensation correction information combined based on the user's positioning information in the k-th network as spatial separation compensation correction information of the k-th network.

* * * * *